United States Patent [19]

Jones

[11] Patent Number: 5,732,194
[45] Date of Patent: Mar. 24, 1998

[54] COMPUTER CONTROLLED RECONFIGURABLE PART FIXTURE MECHANISM

[75] Inventor: Steven Donald Jones, Ann Arbor, Mich.

[73] Assignee: Ford Global Technologies, Inc., Dearborn, Mich.

[21] Appl. No.: 511,126

[22] Filed: Aug. 4, 1995

[51] Int. Cl.$^6$ .......................... G05B 11/32; G05B 19/42
[52] U.S. Cl. .................. 395/80; 395/82; 395/83; 395/96; 395/99; 364/474.24
[58] Field of Search ................ 395/80, 82, 83, 395/99, 96; 364/474.24

[56] References Cited

U.S. PATENT DOCUMENTS

| | | | |
|---|---|---|---|
| 3,980,346 | 9/1976 | Leiber | 303/6 R |
| 4,069,488 | 1/1978 | Fiorenza et al. | 364/474 |
| 4,118,776 | 10/1978 | Isomura | 364/474 |
| 4,149,235 | 4/1979 | Froyd et al. | 364/101 |
| 4,238,840 | 12/1980 | Swainson | 365/119 |
| 4,258,425 | 3/1981 | Ramsey et al. | 395/80 |
| 4,260,941 | 4/1981 | Engelberger et al. | 318/562 |
| 4,300,198 | 11/1981 | Davini | 395/96 |
| 4,530,046 | 7/1985 | Munekata et al. | 364/191 |
| 4,580,207 | 4/1986 | Arai et al. | 364/138 |
| 4,665,492 | 5/1987 | Masters | 364/468 |
| 4,673,226 | 6/1987 | Every et al. | 303/109 |
| 4,738,583 | 4/1988 | Macconochie et al. | 414/735 |
| 4,742,464 | 5/1988 | Duret et al. | 364/474 |
| 4,821,200 | 4/1989 | Öberg | 364/474.24 |
| 4,848,005 | 7/1989 | Ercole et al. | 33/568 |
| 4,990,839 | 2/1991 | Schonlan | 395/83 |
| 5,019,993 | 5/1991 | Montalcini et al. | 364/474.29 |
| 5,131,729 | 7/1992 | Wetzel | 303/113 AP |
| 5,134,569 | 7/1992 | Masters | 364/474.24 |
| 5,148,591 | 9/1992 | Pryor | 29/407 |
| 5,204,942 | 4/1993 | Otera et al. | 395/80 |
| 5,243,266 | 9/1993 | Kasagami et al. | 395/83 |
| 5,267,143 | 11/1993 | Pryor | 364/167 |
| 5,303,384 | 4/1994 | Rodriguez et al. | 395/80 |
| 5,353,386 | 10/1994 | Kasagami et al. | 395/80 |
| 5,429,682 | 7/1995 | Harlow, Jr. et al. | 901/7 |
| 5,561,742 | 10/1996 | Terada et al. | 395/83 |
| 5,625,959 | 5/1997 | Ercole et al. | 33/568 |

OTHER PUBLICATIONS

Digital Electronic Automation S.p.A. Technical Brochure, "Five—NC Flexible Fixturing System", 6 pages, No. CD A7-7/89-GB/1000, 1989.

Witte Technical Brochure, "Alufix", 8 pp., 1993.

*Primary Examiner*—George B. Davis
*Attorney, Agent, or Firm*—Joseph W. Malleck; Roger L. May

[57] ABSTRACT

A computer controlled reconfigurable fixture mechanism having a base, rotatively and pivotably supporting a plurality of fixture linkages. Each linkage has at least two arms connected by a wrist assembly. The wrist assemblies are motor-driven and permit the arms to be rotated and pivoted relative to each other and to the base. A control computer includes a keyboard. Using a keyboard an operator can individually move the arms to a desired location and orientation. Angle sensors associated with each wrist assembly generate feedback signals indicative of the current configuration of the linkages which can be stored in the control computer. The computer can generate position signals for each linkage to return them to the stored configuration. The control computer may also use the physical data of the part generated by a CAD system to configure the linkages to hold the part at the desired location and orientation.

10 Claims, 2 Drawing Sheets

COMPUTER CONTROLLED RECONFIGURABLE PART FIXTURE MECHANISM

TECHNICAL FIELD

The invention is related to reconfigurable part fixture mechanisms and, in particular, to a computer controlled reconfigurable part fixture mechanism.

BACKGROUND ART

The machining, assembly, and inspection of parts on a production basis requires fixtures for holding the part in a desired location and orientation relative to the machine, another part, or the inspection gauges or tools. Historically, special fixtures have been required for each operation and often these fixtures had to be scrapped and new fixtures made if the configuration or size of the part was changed. In general, these fixtures were designed for one specific operation and could not be used universally for subsequent operation or different parts.

To overcome this problem, the prior art has developed manually reconfigurable part fixturing devices such as Alufix, presently available from Witte. Further, the DEA Company has a reconfigurable fixture mechanism called "System 5".

In addition to these manually reconfigurable part fixturing devices, Pryor in U.S. Pat. No. 5,267,143, discloses a vision assisted fixture construction using a laser for the fabrication and alignment of fixtures, jigs and other structures.

DISCLOSURE OF THE INVENTION

The invention is a computer controlled reconfigurable part fixture mechanism having a base and a plurality of reconfigurable linkages attached to the base. Each linkage of the plurality of reconfigurable linkages has a base end rotatably and pivotably attached to the base, a free end, and angle and linear sensors generating feedback signals corresponding to the location of the associated linkage. An end-effector is attached to the free end of each linkage to engage the part to be held by the fixture mechanism. A control computer responsive to the feedback signals and data identifying the part, the desired location of the part, the desired orientation of the part, and the location on the part to be engaged by the end effectors generates position signals for each linkage activating the associated linkage to move its free end to a location determined to engage the end effector with the part at the desired location.

A first object of the invention is a computer controlled reconfigurable part fixture mechanism capable of being reconfigured to hold a variety of parts, one at a time, in desired locations and orientations.

Another object of the invention is a reconfigurable part fixture mechanism capable of being reconfigured under the control of a computer to hold a part at different locations and different orientations to facilitate different operations on the part.

Another object of the invention is a reconfigurable part fixture mechanism having at least three reconfigurable linkages.

Yet another object of the invention is a reconfigurable part fixture mechanism in which each linkage has at least two arms rotationally and pivotably connected to each other and to a supporting base.

Still another object of the invention is that each reconfigurable linkage has at least one angle sensor generating feedback signals to a control computer indicative of the current position of each linkage.

Yet still another object of the invention is that the control computer includes a keyboard by means of which an operator can change the location and orientation of each linkage to properly engage predetermined locations on the part.

Another object of the invention is that the control computer can store the location and configuration of each linkage when manually moved to the proper location and can return each linkage to the stored location and orientation when requested.

Finally, it is an object of the invention that the control computer is responsive to the dimensional data of the part generated by a computer-aided design (CAD) system to generate a configuration of the linkages to hold the part in the required orientation.

These and other objects of the invention will become more apparent from a reading of the specification in conjunction with the drawings.

BEST MODE FOR CARRYING OUT THE INVENTION

Figure 1:
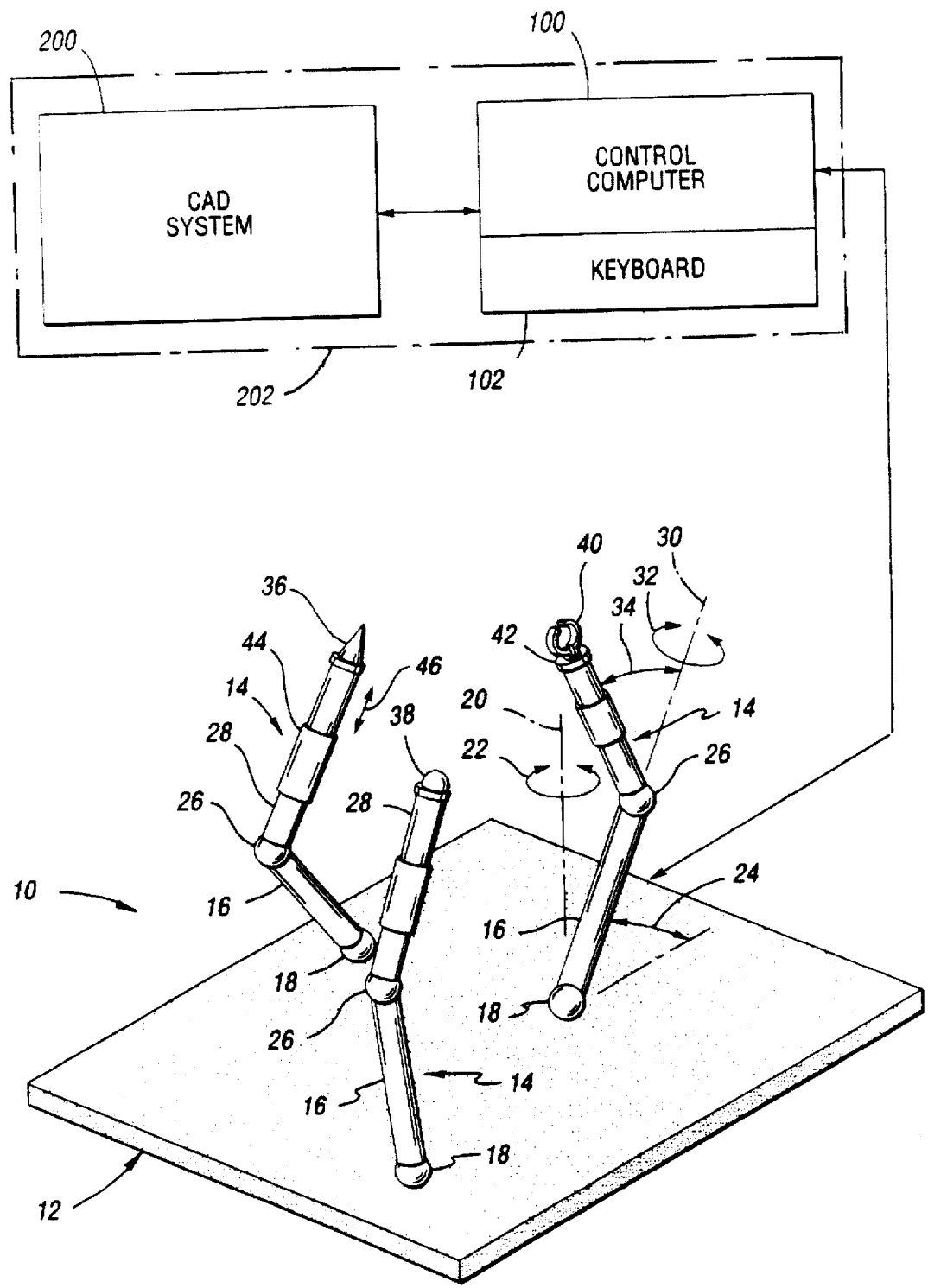
FIG. 1 is a perspective view of the reconfigurable part mechanism in conjunction with a control computer and a CAD system.

The details of the computer controlled reconfigurable part fixture mechanism are shown on the attached drawing. The reconfigurable part fixture mechanism 10 has a base 12 to which are attached at least three computer controlled linkages 14. Each link 14 of the computer controlled linkages has a lower arm 16 which is connected to the base 12 by a computer controlled first wrist assembly 18. As is known in the wrist assembly art, the first wrist assembly 18 permits the arm 16 to be rotated about an axis 20 normal to the base 12, as indicated by arrow 22 and to be pivoted relative to the plane of the base 12, as indicated by arrow 24.

A second wrist assembly 26 connects a second arm 28 to the first arm 16. The second wrist assembly 26 permits the second arm 28 to be rotated about the longitudinal axis 30 of the first arm 16 and to be pivoted relative to the longitudinal axis 30 as indicated by arrows 32 and 34, respectively. End effectors, such as a cone 36, a pin 38 or a gripper 40 are attached to the end of the second arm 28 to hold and support the part or component (not shown) to be held by the fixture mechanism 10.

As is known in the art, the end effectors are not limited to those described above but also include such devices as clamps, suction cups or any other holding device known in the fixturing art.

When an end effector, such as a gripper, a clamp, or other device is used which requires a predetermined orientation to mate with or grip a desired location of the part, a third wrist 42 may be used at the end of the second arm 28 which further permits the end effector to be oriented to the desired position relative to the part.

The first and second arms 16 and 28, respectively, may have a fixed length or a variable length controlled by a linear extension mechanism 44 which permits the arm to be linearly extended or retracted as indicated by arrow 46.

The wrists 18, 26 and 42 may be of any conventional design such as those used on robots. These wrists have electric or hydraulic motors for producing the desired rotational and pivoting motions relative to the base and to each other and also include angle sensors which generate signals indicative of the rotated and pivoted positions. The angle sensors may include any type of angle sensor known in the art, such as encoders, resolvers, inductosyns, interferometers, etc. In a like manner, the linear extension mechanism 44 is driven by a motor and includes a linear sensor generating a signal indicative of the extended or retracted position of the free end relative to the stationary end.

Figure 2:
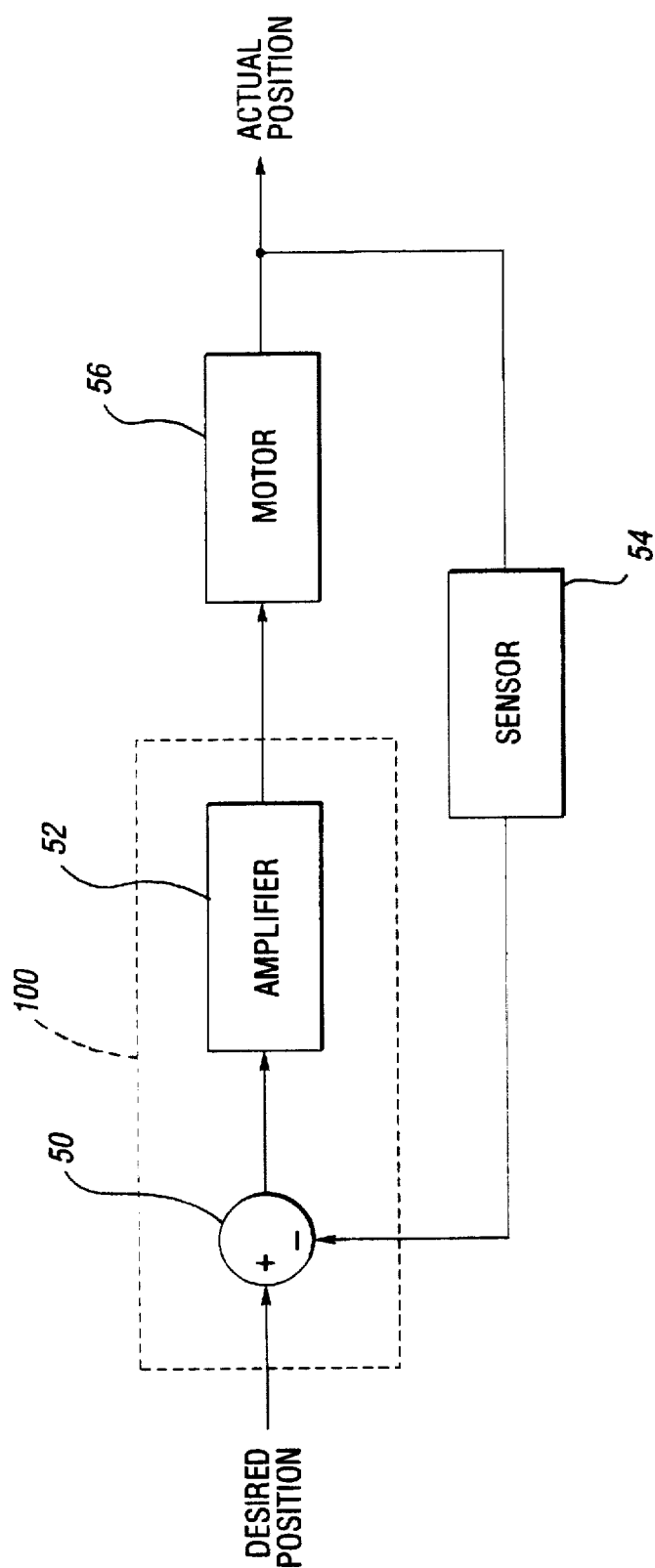
FIG. 2 is an electrical schematic used to explain the control of the linkages.

Preferably, the wrists 18, 26 and 42 and the extension mechanism 44 operate in a closed loop mode as shown in FIG. 2. A comparator 50 and amplifier 52 are part of the control computer 100. The comparator 50 receives the desired position of the wrist or linear mechanism from a memory associated with the control computer, the keyboard 102 or the CAD system 200. The comparator 50 compares the desired position with the actual position of the wrist or linear mechanism measured by a sensor 54. This is shown symbolically in FIG. 2 as the current position of the output of a motor 56. The sensor 54, as known in the art, preferably will measure the position of an output member of the wrist or linear extension mechanism.

The comparator 50 will generate an output signal in response to the actual position being different from the desired position which, after being amplified in amplifier 52, activates the motor 56 to move the output member in a direction to reduce the difference between the desired and actual positions to zero. As is known in the art, the motor 56 may be an electrical motor or a hydraulic motor as may be best suited for a particular application of the reconfigurable part fixture mechanism.

The computer controlled reconfigurable part fixture mechanism may be operated in any of three different modes. In the first mode, the linkages may be electronically displaced using a control computer 100 to engage the part in the desired orientation. In the preferred embodiment, the control computer 100 includes a keyboard 102 by means of which the operator can manually enter commands to reconfigure each linkage 14 so that the end effector is moved to the desired location. The control computer 100 will generate position signals energizing the motors in the wrist assemblies to rotate and angularly displace the arms. The angle sensors embodied in each wrist assembly will generate signals corresponding to the precise rotational and pivotal angles which are fed back to the control computer 100. The control computer will compare the actual angles of the wrists indicated by the feedback signals from the angle sensors with the desired angles and generate the position signals tending to reduce the difference between the actual and desired angles to zero.

When the reconfigurable part fixture mechanism is supporting the part in the desired position and orientation in response to the commands manually entered by the operator, the control computer 100 will store the rotational and pivotable angle of each wrist assembly 18, 26 and 42 as well as the position of the linear extension members for the particular part and the particular operation. The control computer 100 can be instructed to store the rotational and pivoted position of each wrist assembly for a plurality of different parts and operations and upon a request input by means of the keyboard 102, reconfigures the arms of the reconfigurable part mechanism to the stored locations to support the part for machining, welding, assembly or inspection purposes.

In the second mode of operation, the linkages may be manually moved by an operator to the desired locations. After the linkages are in the desired configuration, the control computer 100 can be instructed to store in the control computer the signals from the angle and linear sensors so that the links can be reconfigured to the manually set locations.

In the third mode of operation, the control computer 100 may also be connected to a Computer Aid Design (CAD) system 200 and can be used to interpret data received from the (CAD) system 200 to control the motion and positions of the lower and upper arms 16 and 28, respectively, of the reconfigurable part fixture mechanisms, store the rotational position and angular position of each wrist assembly and specify what end effectors are to be used to properly support and hold the part in the desired location and orientation.

The control computer 100 may also be used to send fixturing information back to the CAD system 200 for further use on other machines.

While the control computer 100 and the Computer Aided Design system 200 are shown as separate entities in the drawing, those skilled in the art will recognize that they can be integrated into a single unit as indicated by phantom block 202.

While the best mode for carrying out the invention has been described in detail, those familiar with the art to which this invention relates will recognize various alternative designs and embodiments for practicing the invention as defined by the following claims.

What is claimed is:

1. A computer controlled reconfigurable fixture mechanism operative to be reconfigured to hold parts in desired locations and orientations, comprising:

a base;

a plurality of reconfigurable linkages, each linkage of said plurality of reconfigurable linkages having a base end attached to said base and a free end;

an end effector attached to said free end of each linkage to engage a part; and a control computer for generating position signals based on data identifying the part, a desired orientation of the part and preselected locations on said part to be engaged by said end effectors, said position signal activating said plurality of reconfigurable linkages to move said free end of each linkage to a location that will permit respective ones of said end effectors to support said part at respective ones of said preselected locations, whereby said linkages cooperate to support the part in a desired location and orientation.

2. The reconfigurable fixturing mechanism of claim 1 wherein each linkage of said plurality of reconfigurable linkages comprises:

a first arm having a first end, an opposite end, and a first longitudinal axis;

a first wrist assembly connecting said first end of said first arm to said base, said first wrist assembly responsive to said position signals to rotate said first arm relative to said base about at least two different axes;

a second arm having a first end, an opposite end and a second longitudinal axis;

at least a second wrist assembly connecting said first end of said second arm to said opposite end of said first arm, said at least a second wrist assembly responsive to said position signals to rotate said second arm relative to said first linear axis of said first arm about at least two different axes; and wherein said opposite end of said second arm is said free end of said linkage.

3. The reconfigurable fixture mechanism of claim 2 wherein at least one linkage of said plurality of linkages has an end effector which requires a predetermined orientation relative to said second longitudinal axis of said second arm, said at least one linkage includes a third wrist assembly responsive to said position signals to orient said end effector relative to said second longitudinal axis of said second arm.

4. The reconfigurable fixture mechanism of claim 3 wherein each of said first and second wrist assemblies comprises:

motors for independently rotating each of said wrist assemblies about said at least said two different axes; and angle sensors for generating feedback signals corresponding to the rotational positions of the wrist assembly relative to each of said at least two different axes.

5. The reconfigurable fixture mechanism of claim 4 wherein each of said third wrist assemblies comprises:

motors for independently rotating said third wrist assembly about at least two different axes; and angle sensors for generating feedback signals corresponding to the rotational position of the wrist assembly relative to each of said at least two different axes.

6. The reconfigurable fixture mechanism of claim 2 wherein at least one of said linkages includes a linear extension mechanism for extending and retracting one of said first and second arms in response to said position signals, said linear extension mechanism having a linear sensor for generating a signal corresponding to the extension of said arm relative to a fixed location.

7. The reconfigurable fixture mechanism of claim 1 wherein said control computer further includes means for moving said free end of each linkage to said location determined to engage the associated end effector with said part at said preselected locations and storage means responsive to feedback signals for storing, relative to each linkage, the locations of the free ends of said linkages.

8. The reconfigurable fixturing mechanism of claim 7 wherein said means for moving is a keyboard for generating signals for each of said reconfigurable linkages corresponding to a desired position.

9. The reconfigurable fixturing mechanism of claim 7 wherein said control computer further includes means responsive to the dimensional data of the part from a computer-aided design (CAD) description of the part and generating a configuration of said plurality of linkages that would accommodate the part and hold it in the desired orientation.

10. A computer controlled reconfigurable fixture mechanism operative to be reconfigured to hold parts in selected locations and orientations, comprising:

a base;

a plurality of reconfigurable linkages, each linkage of said plurality of linkages having a base end movably connected to said base, a free end, and encoders generating feedback signals having values corresponding to an orientation of the linkage relative to fixed orientation;

an end effector attached to said free end of each linkage to engage a part to be held; and a control computer for processing said feedback signals and data identifying the part, a desired orientation of the part and preselected locations on the part to be engaged by said end effectors to generate position signals associated with each linkage, said position signals activating the associated linkage to move said free end to a location determined to engage said end effectors with said part at said preselected locations, said control computer including a keyboard permitting an operator to electronically move said linkages to positions that will permit said end effectors to support said part at the preselected locations, means for storing the location of each linkage in response to said feedback signals, and means for generating said position signals in response to a command entered via said keyboard.

* * * * *